United States Patent [19]

Baechtiger et al.

[11] Patent Number: 5,093,663
[45] Date of Patent: Mar. 3, 1992

[54] PULSE COMPRESSION RADAR SYSTEM WITH DATA TRANSMISSION CAPABILITY

[75] Inventors: Rolf Baechtiger, Oberwill-Lieli; Andreas Steffen, Schlieren, both of Switzerland

[73] Assignee: Siemens-Albis Aktiengesellschaft, Zurich, Switzerland

[21] Appl. No.: 270,561

[22] Filed: Nov. 14, 1988

[30] Foreign Application Priority Data

Nov. 18, 1987 [CH] Switzerland .................. 04490/87

[51] Int. Cl.$^5$ ............................................. G01S 13/28
[52] U.S. Cl. .................................... 342/60; 342/45; 342/201
[58] Field of Search ................. 342/60, 201, 202, 204, 342/175, 45

[56] References Cited

U.S. PATENT DOCUMENTS

| | | |
|---|---|---|
| 3,339,197 | 8/1967 | Tate . |
| 3,654,554 | 4/1972 | Cook . |
| 3,725,786 | 4/1973 | Earp . |
| 3,891,985 | 6/1975 | Oigarden et al. . |
| 4,072,946 | 2/1978 | Kneefel . |
| 4,291,309 | 9/1981 | Spiller et al. . |

OTHER PUBLICATIONS

"Introduction to Radar Systems", Skolnik, McGraw Hill, 1980, pp. 420-435.

Primary Examiner—Mark Hellner
Attorney, Agent, or Firm—Adel A. Ahmed

[57] ABSTRACT

A radar system, such as a tracking radar installation or other radar installation which is of the pulse compression type, transmits data during transmission of the radar signal. The data is transmitted by inserting, into the radar signal, at least one short nonpulse interval. The position of the nonpulse interval within the radar pulse can be modulated.

13 Claims, 2 Drawing Sheets

PULSE COMPRESSION RADAR SYSTEM WITH DATA TRANSMISSION CAPABILITY

BACKGROUND OF THE INVENTION

The invention relates to radar systems, and more particularly relates to radar systems which are used in military applications. In its most immediate sense, the invention relates to military-type pulse compression radar systems.

Military pulse compression radar systems such as are used for tracking radar often use pulse expansion to optimally utilize available high-frequency energy and to achieve adequate distance resolution. When using such systems, it is frequently desirable to communicate with the object tracked. One such application is where the object tracked is a pilotless drone and remote control of the drone is desired; another such application is Information Friend or Foe (IFF) systems, where the tracked object identifies itself to the tracking radar and thereby enables the radar operator to determine whether the object is friendly (and therefore to be left unmolested) or unfriendly (and therefore a candidate for destruction).

For remote control applications, it is known to use a second supplemental transmitter to send control information to the drone. For IFF systems, a second unit is integrated into the radar system. In either case, the additional unit entails additional expense.

SUMMARY OF THE INVENTION

One object of the invention is to provide a radar system which can be used for remote control or IFF systems without the additional expense required for an additional transmitter.

Another object is to provide such a system which can be implemented by modification of existing systems.

Yet a further object is, in general, to improve on existing systems of this general type.

In accordance with the invention, at least one short nonpulse interval is inserted into a radar signal of the pulse compression type. This nonpulse interval can be used to transmit information to the tracked object (e.g. a drone) or to receive information (e.g. friendly/unfriendly aircraft) from the tracked object.

Advantageously, the location of the nonpulse interval(s) is adjustable and the existing location of the nonpulse intervals is a source of data.

Further advantageously, the location of the nonpulse interval(s) is modulated from one radar pulse to another one. Where the modulation is accomplished in a random or difficult-to-predict manner, third parties will be unlikely to identify the modulation and the system is therefore highly secure as regards third parties.

BRIEF DESCRIPTION OF THE DRAWINGS

Exemplary and non-limiting preferred embodiments of the invention are shown in the drawings, in which.

DETAILED DESCRIPTION OF PREFERRED EMBODIMENTS

Figure 1:
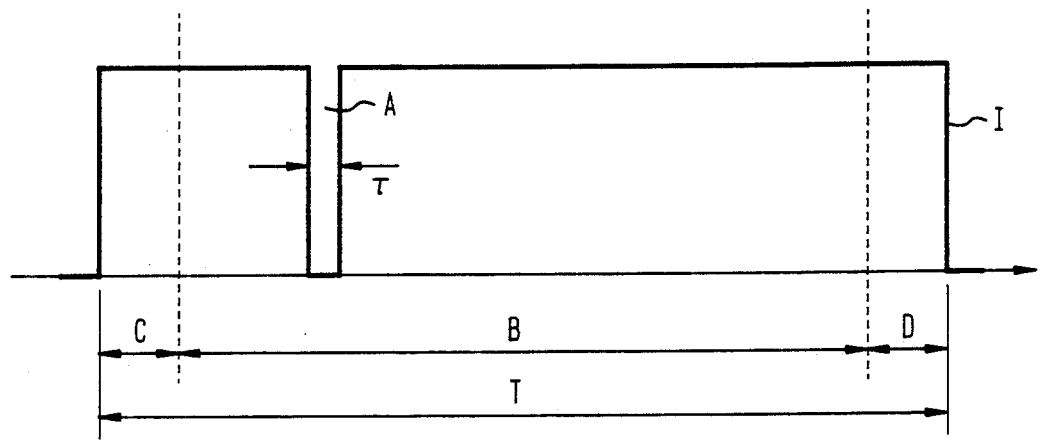
FIG. 1 is a schematic diagram of a radar signal in accordance with the invention.

Referring first to FIG. 1, a radar pulse I (advantageously of the frequency modulated type) has at least one relatively short nonpulse interval A in it. The following description will proceed as if there is only one nonpulse interval A, but this is merely for simplicity; there may be more than one, or even many, nonpulse intervals A.

The nonpulse interval A is, in the preferred embodiment, restricted to a predetermined range B of positions within the radar pulse I; the nonpulse interval A must follow a leading interval C and must precede a trailing interval D. The duration $\tau$ of the nonpulse interval A must be small as compared to the duration T of the pulse I.

This duration must be chosen subject to two constraints. If the duration $\tau$ is too short, e.g. if the duration $\tau$ is less than approximately the reciprocal of the system bandwidth, the bandwidth of the radar pulse I will exceed the system bandwidth. If the duration $\tau$ is too long, the side lobes in the time diagram of the radar pulse I will be too large. Advantageously, the duration $\tau$ of the nonpulse interval A is between 2% and 3% of the duration T of the pulse I; in the preferred embodiment, the duration $\tau$ is chosen to be 2.5% of the duration T.

In the preferred embodiment, the leading interval C and the trailing interval D are each approximately 6% of the duration T. This is not part of the invention; the leading and trailing intervals C and D are chosen such that even where system error makes it impossible to precisely identify the beginning and end of the radar pulse I, that the beginning and end will be respectively recognized before and after the nonpulse interval A is detected. Advantageously, the position of the nonpulse interval A within the range B can be adjusted (position modulation). This permits the radar operator to transmit data while transmitting the radar pulse I. In this manner, an object (not shown) which is exposed to the radar pulse I can receive telemetry information and the echo of the radar pulse I can be identified.

Typically, a radar pulse I will have a duration T of 6 $\mu$S, and appropriate leading and trailing intervals C and D will be 0.5 $\mu$S. This leaves a range B of 5 $\mu$S in which the nonpulse intervals A may be located. Advantageously, the duration $\tau$ of the nonpulse interval A may be chosen as 150 nS; this means that the nonpulse intervals A may be located at any one of 32 locations within range B, and the location of each nonpulse interval A may be described by a 5-bit digital word. The position of the nonpulse interval A may be modulated from one radar pulse I to another. When this is implemented, the radar signal can be used to transmit data to objects which are within range of the radar signal. Alternatively, where such data transmission is unnecessary, the invention permits the echo signal to be identified using identification criteria which vary from one pulse to another. (The variation need not be, and advantageously is not, easily predictable. A random variation is highly advantageous because of the difficulty which is intrinsic to mimicking it and thereby making it difficult for a third party to transmit interfering radar signals.) To implement this identification scheme, it would for example be possible to store (in, e.g. a memory M, see FIG. 2) the particular position of the nonpulse interval A for the radar pulse I in question and to compare this with the position at which the nonpulse interval in the echo is detected by the stage 6A (see FIG. 2). Where the two positions fail to match, the echo does not come from the originally transmitted radar pulse I and therefore may be suppressed. This makes it possible to eliminate radar signals which originate from interference transmitters.

Figure 4:
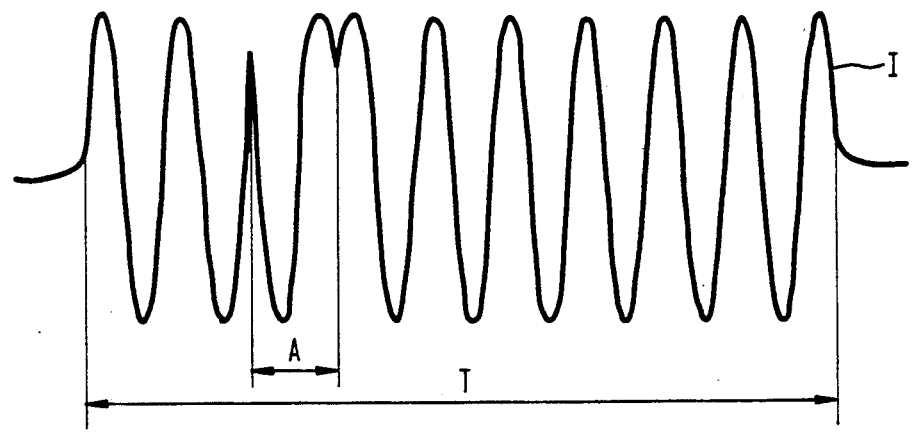
FIG. 4 is a schematic of a second preferred embodiment of a radar signal in accordance with the invention.

In a second preferred embodiment, the nonpulse interval A is, as is illustrated in FIG. 4, phase-shifted with respect to the signal fractions which immediately precede and follow it. Advantageously, the phase shift is 180°, to achieve optimum modulation. Since the phase shift completely fills the nonpulse interval A, its length corresponds to the duration $\tau$ and is therefore short as compared with the duration T of the radar pulse I.

Figure 2:
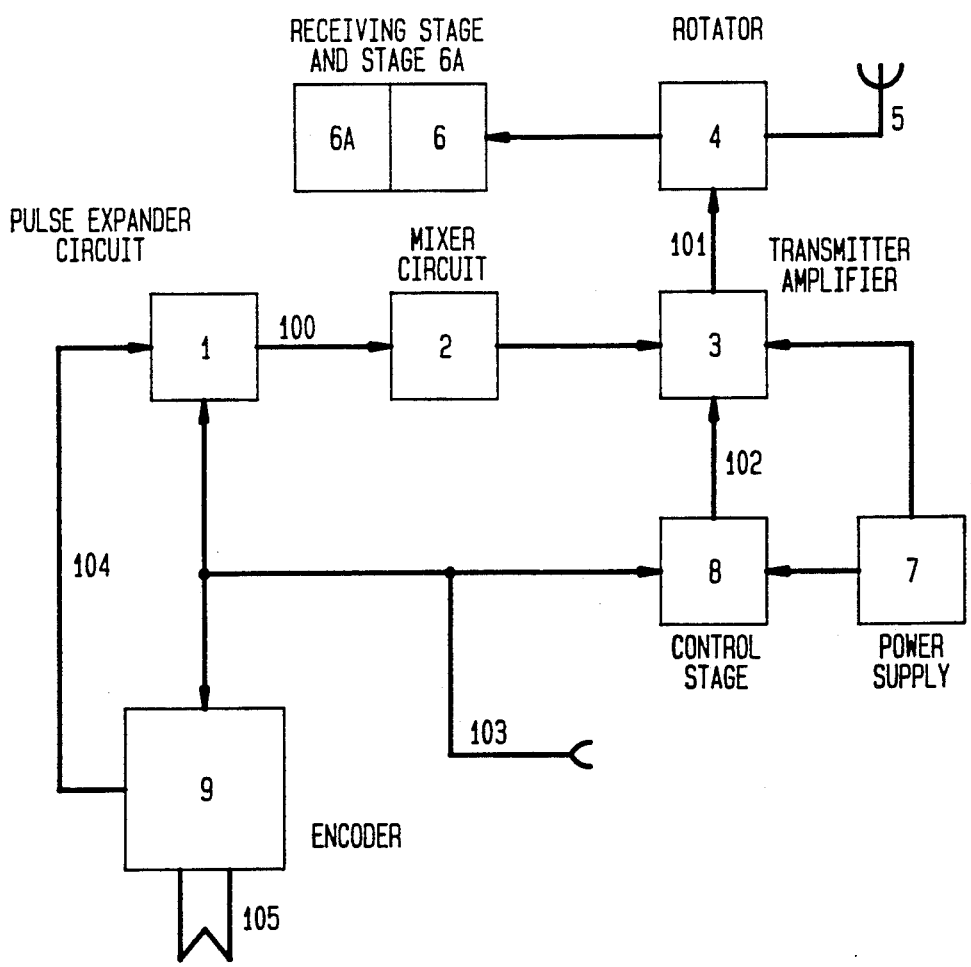
FIG. 2 is a block diagram of a preferred embodiment of the invention as embodied in a radar system.

FIG. 2 shows how a conventional radar system for generating frequency-modulated pulses may be modified in accordance with the invention. A pulse expander circuit 1 produces an output signal 100 which is mixed upwardly in a mixer circuit 2 and directed to a transmitter amplifier 3. The amplified radar pulse is directed through line 101 to a rotator 4 and transmitted by a combination transmitting and receiving antenna 5. Echo pulses received by the antenna 5 are passed through the rotator 4 to a receiving stage 6 where they are processed in a manner which is known to persons skilled in the art. (Receiving stage 6 contains a stage 6A which detects the existence and temporal positions of nonpulse intervals in the incoming echo signals.) A power supply 7 is connected to the transmitter amplifier 3 as well as to a control stage 8, which latter is connected to the transmitter amplifier 3 by a line 102. Line 103 supplies externally-generated trigger signals to the pulse expander circuit 1 as well as to the control stage 8 (which is known by itself in radar systems which generate frequency modulated pulses).

In the preferred embodiment, an encoder 9 is connected to the pulse expander circuit 1 by a line 104 and also to line 103. The encoder 9 encodes data which are input (for example, in parallel form) at 105 into nonpulse interval position data which causes a blanking pulse to be input to the pulse expander circuit 1 along line 104. Thus, the data input at 105 establish the position of the nonpulse interval and the pulse expander circuit 1 implements the insertion of the nonpulse interval. The processing of the output signal after the pulse expander circuit 1 is known by itself.

Figure 3:
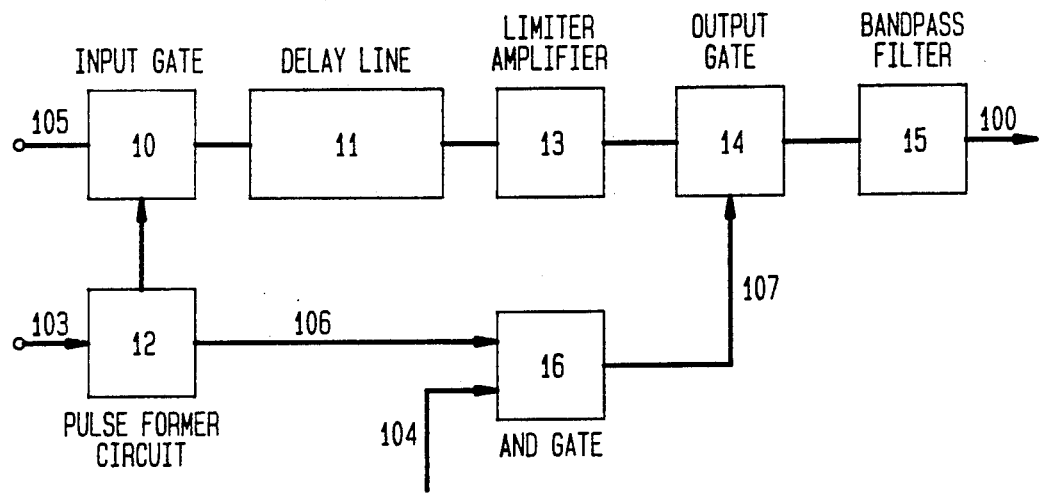
FIG. 3 is a block diagram of a portion of the preferred embodiment.

Turning now to FIG. 3, the pulse expander circuit 1 may advantageously include an input gate 10 which receives an IF signal along line 105. The input gate 10 is connected to a dispersive delay line 11, which may advantageously be a surface acoustic wave expansion unit, or SAW; the dispersive delay line 11 generates a frequency modulated high frequency signal, or CHIRP signal. This CHIRP signal is routed through a limiter amplifier 13, which limits the amplitude of the signal, and thence to an output gate 14, which passes the signal to a bandpass filter 15. From the bandpass filter 15, the output signal is processed as described above in connection with FIG. 2.

To produce a nonpulse interval A, an AND gate 16 is advantageously used to turn the output gate 14 o and off via line 107. A first input of the AND gate 16 is connected to a pulse former circuit 12, which supplies gate pulses along line 106; the gate pulses determine the length of the radar signal pulse. The second input of the AND gate 16 is connected, via line 104, to the encoder 9; blanking pulses along line 104 determine the positions of nonpulse intervals.

The above-described preferred embodiment produces a radar signal with adequately suppressed side lobes. Where the duration $\tau$ is 0.1 $\mu$S, the side lobe suppression at the receiver is at least 34 dB. Since this is only about 6 dB below the unencoded radar signal, normal radar functions are essentially unimpaired. As a result, the preferred embodiment does not require that the functional characteristics of the radar system be redesigned. Consequently, conventional tracking radar systems and systems which are of the pulse compression type may be conveniently retrofitted in accordance with the invention.

Figure 5:
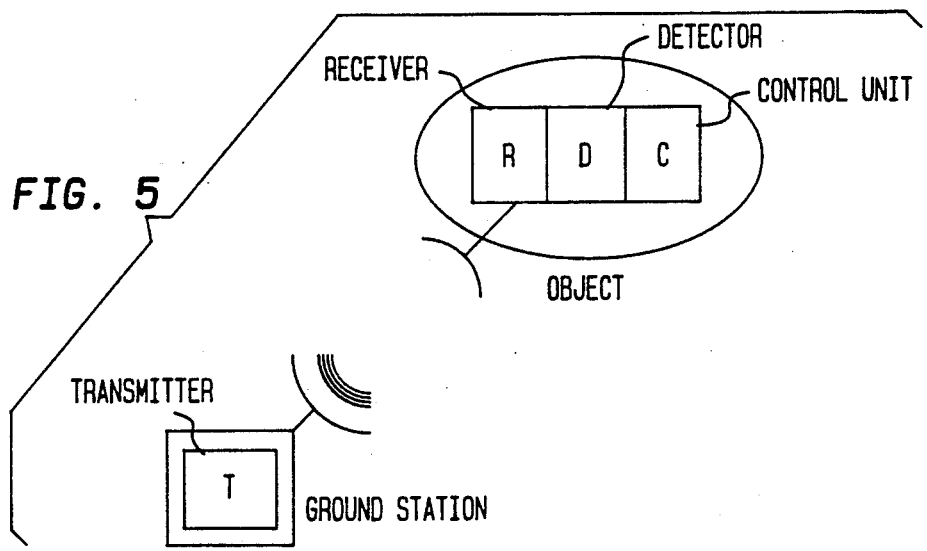
FIG. 5 shows a telemetry embodiment in accordance with the invention.

Since radar transmitters generally operate at high peak power, the data transmission in the radar signal is highly secure. Furthermore, the intensity of the radar signal permits the use of a simple receiver in the object which is exposed to the radar signal. Advantageously, the receiver may contain a decoder which determines the position(s) of the nonpulse interval(s) for the purpose of telemetry or remote control of the object itself, for example if the object is a drone. This is illustrated schematically in FIG. 5, in which TR schematically indicates a radar installation, O schematically indicates an object which is being tracked by the radar installation TR or otherwise exposed to radar signals produced thereby, R indicates a receiver in the object O, D indicates a detector circuit which detects the temporal positions of the nonpulse intervals in the radar signal, and C indicates control apparatus which uses the detected temporal positions to, e.g., control the object 0 or send an identification signal to the radar installation TR.

Those skilled in the art will understand that changes can be made in the preferred embodiments here described, and that these embodiments can be used for other purposes. Such changes and uses are within the scope of the invention, which is limited only by the claims which follow.

We claim:

1. A method of transmitting data in a radar pulse of the pulse compression type, comprising the steps of:
   inserting into said radar pulse at least one short nonpulse interval, and
   modulating the position of said at least one short nonpulse interval.

2. A pulse compression radar system in which data can be transmitted by a radar pulse of the pulse compression type, comprising:
   means for inserting, into said radar pulse, at least one short nonpulse interval; and
   means for detecting said at least one short nonpulse interval in an echo of said radar pulse.

3. The system of claim 2, wherein each of said at least one short nonpulse intervals has a duration which is not less than 2% of the duration of a pulse of said radar signal and is not greater than 3% of the duration of a pulse of said radar signal.

4. The system of claim 3, wherein each of said at least one short nonpulse intervals has a duration which is approximately 2.5% of the duration of a pulse of said radar signal.

5. The system of claim 2, further comprising means for adjusting the position of said at least one short nonpulse interval within said radar pulse.

6. The system of claim 6, further comprising means for modulating said position during transmission of a plurality of pulses of said radar pulse.

7. The system of claim 2, wherein said inserting means inserts said at least one short nonpulse interval after a leading interval in said radar pulse and before a trailing interval in said radar pulse.

8. The system of claim 7, wherein said leading and trailing intervals are each approximately 6% of the duration of a pulse of said radar pulse.

9. A transmitter for a pulse compression radar system, comprising:
- a pulse expander circuit which produces an output signal in accordance with blanking signals; and
- an encoder which encodes data into blanking signals and which is connected to said pulse expander circuit, whereby said encoded blanking signals are supplied to said pulse expander circuit.

10. The transmitter of claim 9, wherein said pulse expander circuit comprises:
- an AND gate with a first input for gate pulses and a second input for blanking pulses; and
- an output gate connected to the output of the AND gate and controlling transmission of radar pulses in accordance with the logical state of the output of said AND gate.

11. The system of claim 2, further comprising:
- means for detecting, in said echo, the temporal position of said at least one short nonpulse interval; and
- means for comparing said detected temporal position with the temporal position, in said radar pulse, of said at least one short nonpulse interval.

12. The system of claim 2, further comprising:
- means for detecting, in said radar pulse, the temporal position of said at least one short nonpulse interval, said detecting means being located in an object which is to be exposed to said radar pulse; and
- means for utilizing said detected temporal position.

13. The method of claim 1, wherein said at least one short nonpulse interval is phase-shifted with respect to the radar pulse into which said at least one short nonpulse interval is inserted.

* * * * *